(12) United States Patent
Huang

(10) Patent No.: US 7,652,662 B2
(45) Date of Patent: Jan. 26, 2010

(54) PORTABLE ELECTRONIC DEVICE AND A METHOD OF CONTROLLING THE SAME

(75) Inventor: Chen-Fu Huang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 579 days.

(21) Appl. No.: 11/556,348

(22) Filed: Nov. 3, 2006

(65) Prior Publication Data

US 2007/0252820 A1 Nov. 1, 2007

Related U.S. Application Data

(60) Provisional application No. 60/745,627, filed on Apr. 26, 2006.

(51) Int. Cl.
*G06F 3/041* (2006.01)

(52) U.S. Cl. .................. 345/173; 345/156; 345/157; 345/162

(58) Field of Classification Search .......... 345/156, 345/157, 168, 169, 173, 174, 175, 176, 177, 345/178, 179, 162; 178/18.06, 18.07, 18.08, 178/18.09, 18.11, 19.01, 19.02, 19.03, 19.04, 178/19.05, 19.06
See application file for complete search history.

(56) References Cited

U.S. PATENT DOCUMENTS

| | | | |
|---|---|---|---|
| 4,633,436 A * | 12/1986 | Flurry | 345/179 |
| 6,292,179 B1 | 9/2001 | Lee | |
| 6,335,727 B1 * | 1/2002 | Morishita et al. | 345/179 |
| 6,658,271 B1 * | 12/2003 | Wu | 455/573 |
| 6,704,032 B1 | 3/2004 | Falcon et al. | |
| 6,760,009 B2 * | 7/2004 | Omura et al. | 345/157 |
| 7,126,587 B2 * | 10/2006 | Kawakami et al. | 345/168 |
| 2003/0181228 A1 * | 9/2003 | Kim | 455/575.3 |
| 2004/0174398 A1 | 9/2004 | Luke et al. | |
| 2004/0183834 A1 * | 9/2004 | Chermesino | 345/773 |
| 2004/0212617 A1 | 10/2004 | Fitzmaurice et al. | |
| 2005/0225540 A1 * | 10/2005 | Kawakami et al. | 345/173 |
| 2005/0270274 A1 | 12/2005 | Bachmann | |

OTHER PUBLICATIONS

CN office action mailed May 9, 2008.

* cited by examiner

*Primary Examiner*—My-Chau T Tran
(74) *Attorney, Agent, or Firm*—Thomas, Kayden, Horstemeyer & Risley

(57) ABSTRACT

A portable communication device. The portable communication device comprises a touch screen, a key code generator, and a controller. The touch screen generates event information in response to a manipulation on the screen, wherein the event information specifies position information corresponding to the manipulation. The key code generator generates a key code corresponding to the event information according to the position information thereof, wherein the key code indicates an upward, downward, leftward, or rightward key code, and the key code does not correspond to any visual item displayed on the touch screen.

16 Claims, 5 Drawing Sheets

PORTABLE ELECTRONIC DEVICE AND A METHOD OF CONTROLLING THE SAME

This application claims priority of U.S. Provisional Patent Application Ser. No. 60/745,627, filed Apr. 26, 2006, entitled LOOK-UP TABLE RESIZE IMAGE WITHOUT LOOK-UP TABLE MEMORY. The contents of the provisional applications are hereby incorporated by reference.

BACKGROUND

The invention relates to portable electronic devices, and in particular to methods and systems of controlling a portable electronic device, such as a mobile phone, by a touch screen.

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Various portable electronic devices are capable of implementing game applications. Most game applications require directional keys in implementation. Using a mobile phone as an example of portable electronic devices. In addition to communication and call-related functions, current mobile phones can implement various other applications. For example, many mobile phones can implement game applications.

Recently, touch screens have become increasingly popular in mobile phones. However, some mobile phones comprising a touch screen, do not have directional keys. One problem generally associated with using this type of mobile phone is difficulty in implementing game applications requiring directional keys. For mobile phone with a touch screen but not directional keys, applications requiring directional keys cannot be implemented therein. The described applications must be modified for use with this type of mobile phone. The modification is time consuming. In addition, manipulations of the modified application are different from general non-modified applications. Inconvenient is thus incurred.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A method of controlling a portable electronic device comprising a touch screen is provided. Event information is generated in response to a manipulation of the touch screen, wherein the event information specifies position information corresponding to the manipulation. A key code corresponding to the event information is generated according to the position information thereof, wherein the key code indicates an upward, downward, leftward, or rightward key code, and the key code does not correspond to any visual item displayed on the touch screen. The portable electronic device is then controlled by controller according to the key code.

Also provided is a portable electronic device. The portable electronic device comprises a touch screen, a key code generator, and a controller. The touch screen generates event information in response to a manipulation on the touch screen, wherein the event information specifies position information corresponding to the manipulation. The key code generator generates a key code corresponding to the event information according to the position information thereof, wherein the key code indicates an upward, downward, leftward, or rightward key code.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve specific developer goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electronic changes may be made without departing from the spirit and scope of the invention. The following detailed description is, therefore, not to be taken in a limiting sense. The leading digit(s) of reference numbers appearing in the figures corresponds to the figure number, with the exception that the same reference number is used throughout to refer to an identical component which appears in multiple figures. It should be understood that the many of the elements described and illustrated throughout the specification are functional in nature and may be embodied in one or more physical entities or may take other forms beyond those described or depicted.

In the invention, a key code is generated in response to a manipulation on a touch screen, wherein the key code does not correspond to a visual item displayed on the touch screen. It should be noted that the invention is applicable to portable devices comprising a touch screen, such as mobile phones, smart phones, PDAs and so on. Here, a mobile phone is taken for exemplary explanation.

Figure 1:
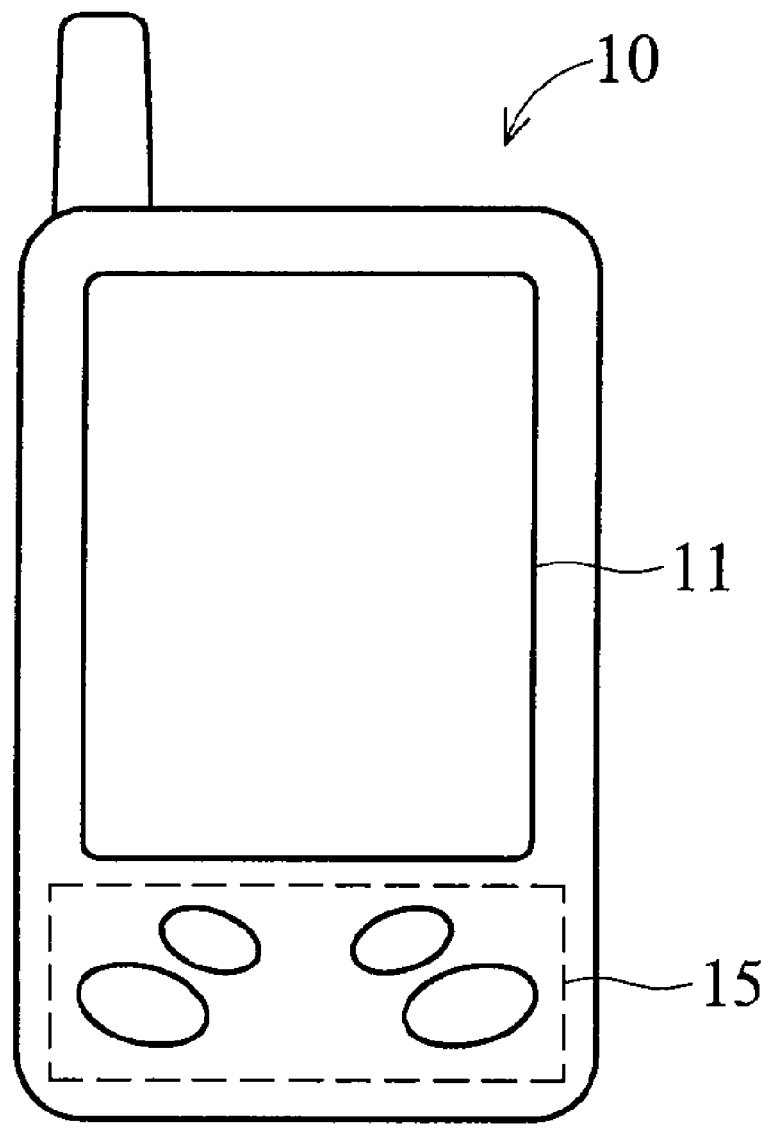
FIG. 1 shows a schematic view of an embodiment of a touch screen mobile phone.

FIG. 1 is a schematic view of a touch screen mobile phone 10 of the invention, comprising a touch screen 11 and a keypad 15. The touch screen 11 is a touch sensitive display screen capable of receiving user's inputs. The keypad 15 comprises some function keys while does not comprise directional keys, such as up, down, left, and rightward keys.

Figure 2:
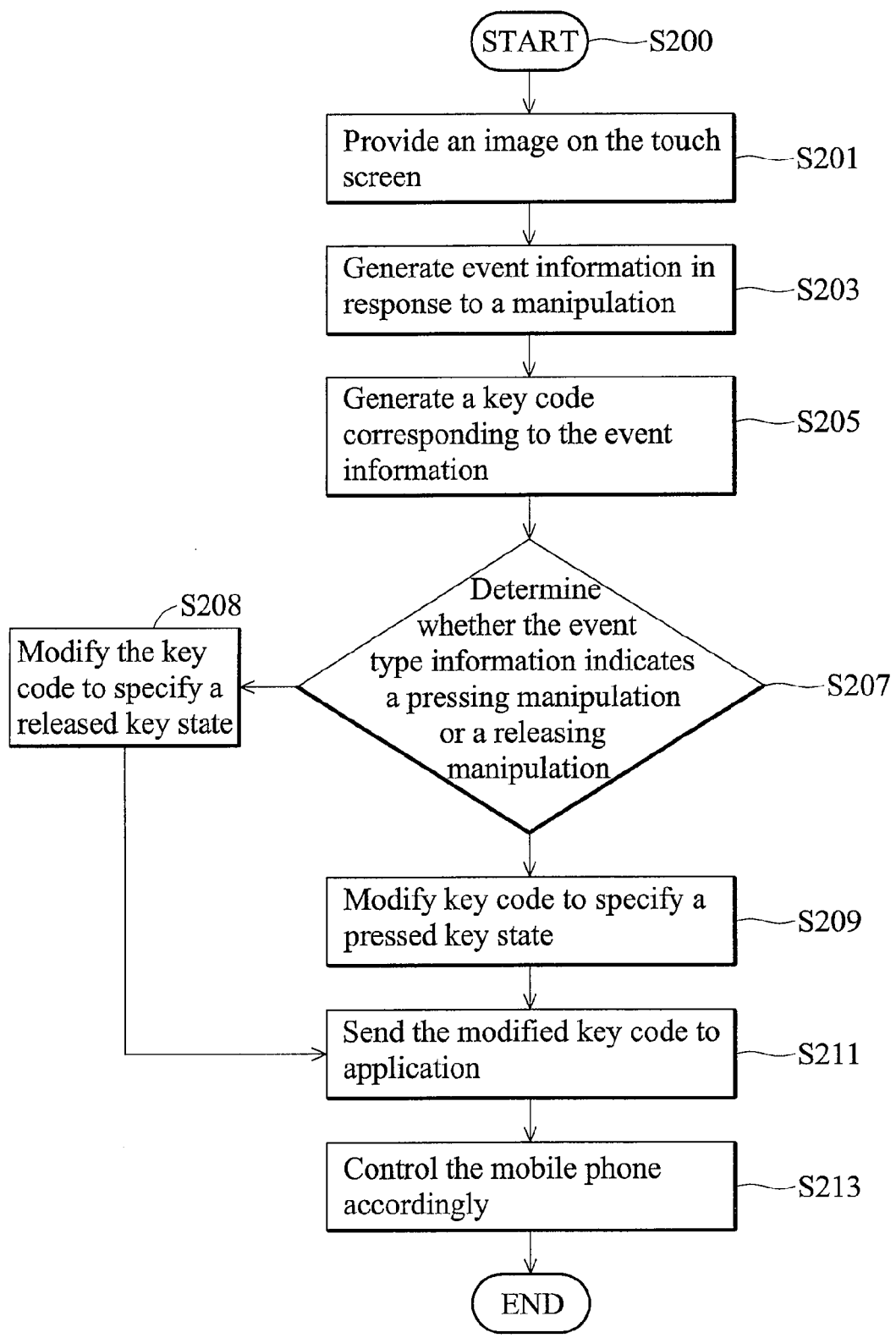
FIG. 2 is a flowchart of an embodiment of a method of controlling a portable electronic device comprising a touch screen.

FIG. 2 is a flowchart of an embodiment of a method for controlling a portable electronic device by a touch screen. The method is implemented in a touch screen portable electronic device (such as the mobile phone 10 of FIG. 1), beginning with a start step (step S200). An MMI layout is provided on the touch screen (step S201). Here, the MMI layout corresponds to operation of an application of the mobile phone, such as a game application. Event information is generated in response to manipulation of the touch screen (step S203). The manipulation can be a press or release action on the touch screen. The event information comprises position information corresponding to the manipulation. For example, the position information can be presented by X and Y coordinates of the point at which the manipulation is operated. In addition, the event information further comprises event type information specifying whether the event information is generated in response to a press or a release manipulation of the touch screen. A key code which indicates an up, down, left, or rightward key is generated according to the position information of the corresponding event information (step S205). Here, the key code does not correspond to a visual item displayed on the touch screen. In other words, no visual item corresponding to the up, down, left, or rightward key is displayed on the touch screen. It is determined whether the event type information indicates a press manipulation or a release manipulation (step S207). If the event type information indicates a press manipulation, the method proceeds to step S209, otherwise, to step S208. In step S209, the key code is modified to further specify a pressed key state. In step S208, the key code is modified to further specify a released key state. In step S211, the modified key code is sent to the application, such as a game application, and the mobile phone 10 is controlled accordingly (step S213).

Figure 3:
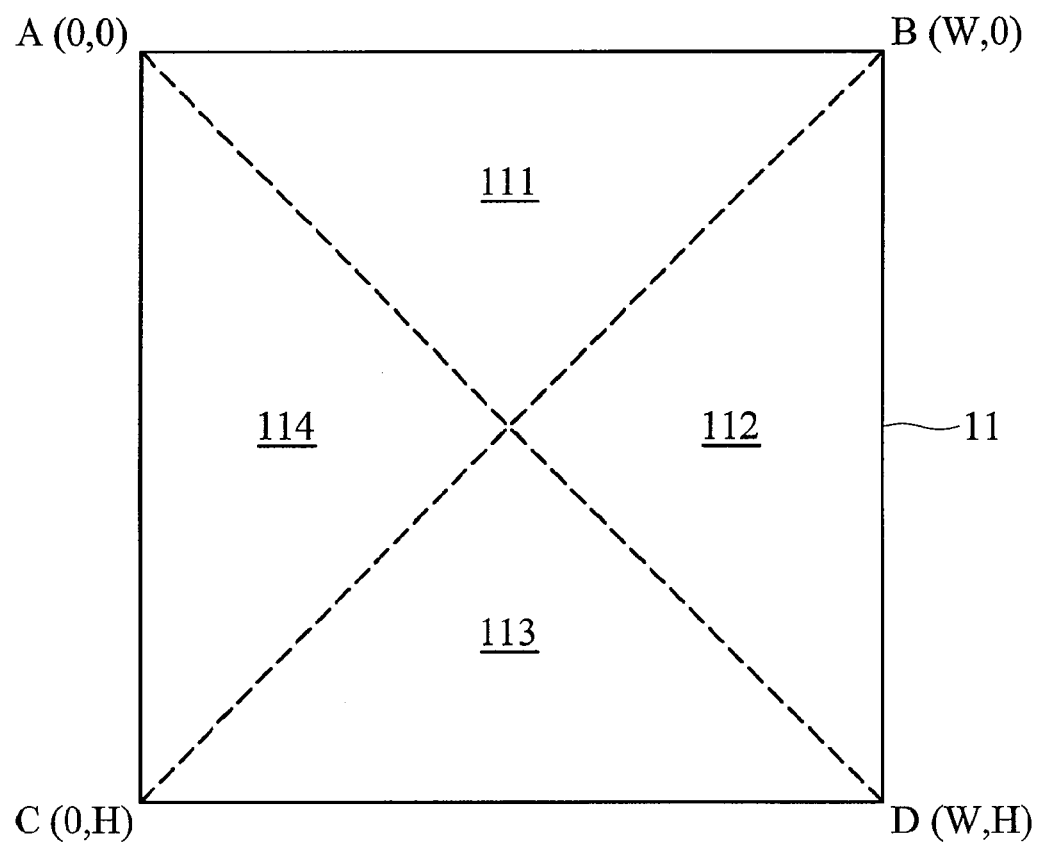
FIG. 3 is a schematic view of an embodiment of converting event information to a key code.

FIG. 3 is a schematic view of an embodiment of converting event information to a key code. The embodiment of FIG. 3 can be implemented in the system of FIG. 1 according to the method of FIG. 2. Key code is generated according to user's manipulation on screen 11, such as press or release. Four extreme points A, B, C, and D of screen 11 are marked in FIG. 3. The extreme points of screen 11 are labeled using an X-Y coordinate system, wherein the coordinates of the extreme points A, B, C, and D are (0,0), (W,0), (0,H), and (W,H), respectively. Screen 11 is divided into 4 parts 111~114 by diagonal lines thereof. The diagonal lines of screen 11 are specified by the following equations:

$$Hx - Wy = 0 \quad \text{(equation 1)}$$

$$Hx + Wy - WH = 0 \quad \text{(equation 2)}$$

The equation 1 specifies the diagonal line AD, and the equation 2 specifies the diagonal line BC. When screen 11 is manipulated, event information is generated in response thereto. The manipulation can be press or release on the touch screen. The event information specifies position information corresponding to the manipulation. For example, the position information can be presented by X and Y coordinates of the point at which the manipulation is operated. In addition, the event information further comprises event type information specifying whether the event information is generated in response to a press or a release manipulation of the touch screen. Here, the event information is presented as (X,Y,M), wherein X and Y specify the position information, and M specifies the event type information. X is an X coordinate of the manipulated point, Y is a Y coordinate of the manipulated point, and M specifies a type of the manipulation. It is determined which part the manipulated point locates by substituting position information (X,Y) in equations 3 and 4 as follows:

$$Hx - Wy = P \quad \text{(equation 3)}$$

$$Hx + Wy - WH = Q \quad \text{(equation 4)}$$

The equation 3 corresponds to the diagonal line AD, and the equation 4 corresponds to the diagonal line BC. By substituting position information (X,Y) in equations 3 and 4, P and Q are obtained, respectively. Signs of P and Q are then used to determine which one of parts 111, 112, 113, 114 the manipulated point locates in. The point (X,Y) locates in part 111 when P is positive and Q is negative, in part 112 when both P and Q are positive, in part 113 when P is negative and Q is positive, in part 114 when both P and Q are negative. A key code is generated according to the position information and the event type information of the corresponding to the event information. For example, when point (X,Y) locates in part 111 and the event type indicates a press manipulation, a key code indicating "upward key pressed" is generated, and when point (X,Y) locates in part 111 and the event type indicates a release manipulation, a key code indicating "upward key released" is generated. Similarly, when point (X,Y) locates in part 112 and the event type indicates a press manipulation, a key code indicating "rightward key pressed" is generated, and when point (X,Y) locates in part 112 and the event type indicates a release manipulation, a key code indicating "rightward key released" is generated. When point (X,Y) locates in part 113 and the event type indicates a press manipulation, a key code indicating "downward key pressed" is generated, and when point (X,Y) locates in part 113 and the event type indicates a release manipulation, a key code indicating "downward key released" is generated. When point (X,Y) locates in part 114 and the event type indicates a press manipulation, a key code indicating "leftward key pressed" is generated, and when point (X,Y) locates in part 114 and the event type indicates a release manipulation, a key code indicating "leftward key released" is generated.

Figure 4:
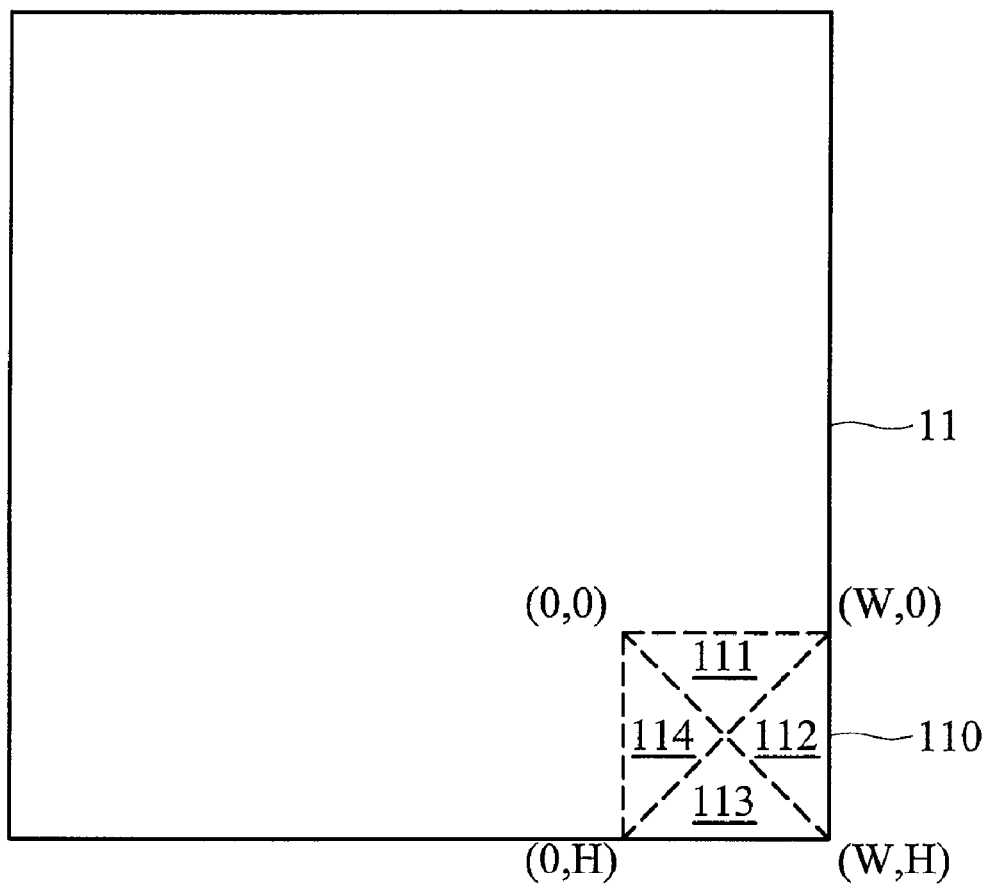
FIG. 4 is a schematic view of another embodiment of converting event information to a key code.

FIG. 4 is an embodiment of converting event information to a key code. Key codes are generated according to manipulations on a limited part of screen 11. Here, area 110 is used for sensing inputs corresponding to directional commands. For example, screen 11 displays a scene of a game application, and area 110 may display scores of player(s). Four extreme points A, B, C, and D of area 110 are marked in FIG. 4.

The extreme points of area 110 are labeled using an X-Y coordinate system, wherein the coordinates of the extreme points A, B, C, and D are (0,0), (W,0), (0,H), and (W,H), respectively. Area 110 is divided into 4 parts 111~114 by diagonal lines thereof. The diagonal lines of area 110 are specified by the following equations:

$$Hx - Wy = 0 \quad \text{(equation 1)}$$

$$Hx + Wy - WH = 0 \quad \text{(equation 2)}$$

When area 110 is manipulated, event information is generated in response thereto. The manipulation can be press or release on the touch screen. The event information specifies position information corresponding to the manipulation. For example, the position information can be presented by X and Y coordinates of the point at which the manipulation occurs. In addition, the event information further comprises event type information specifying whether the event information is generated in response to a press or a release manipulation of the touch screen. Here, the event information is presented as (X,Y,M), wherein X and Y specify the position information, and M specifies the event type information. X is an X coordinate of the manipulated point, Y is a Y coordinate of the manipulated point, and M specifies a type of the manipulation. It is determined whether the manipulated point locates in parts 111, 112, 113, or 114 by substituting position information (X,Y) in equations 3 and 4 as follows:

$$Hx-Wy=P \quad \text{(equation 3)}$$

$$Hx+Wy-WH=Q \quad \text{(equation 4)}$$

By substituting position information (X,Y) in equations 3 and 4, P and Q are obtained, respectively. Signs of P and Q are then used to determine whether the manipulated point locates in parts 111, 112, 113, or 114. The point (X,Y) locates in part 111 when P is positive and Q is negative, in part 112 when both P and Q are positive, in part 113 when P is negative and Q is positive, in part 114 when both P and Q are negative. A key code is generated corresponding to the event information according to the position information and the event type information. For example, when point (X,Y) locates in part 111 and the event type indicates a press manipulation, a key code indicating "upward key pressed" is generated, and when point (X,Y) locates in part 111 and the event type indicates a release manipulation, a key code indicating "upward key released" is generated. Similarly, when point (X,Y) locates in part 112 and the event type indicates a press manipulation, a key code indicating "rightward key pressed" is generated, and when point (X,Y) locates in part 112 and the event type indicates a release manipulation, a key code indicating "rightward key released" is generated. When point (X,Y) locates in part 113 and the event type indicates a press manipulation, a key code indicating "downward key pressed" is generated, and when point (X,Y) locates in part 113 and the event type indicates a release manipulation, a key code indicating "downward key released" is generated. When point (X,Y) locates in part 114 and the event type indicates a press manipulation, a key code indicating "leftward key pressed" is generated, and when point (X,Y) locates in part 114 and the event type indicates a release manipulation, a key code indicating "leftward key released" is generated.

Figure 5:
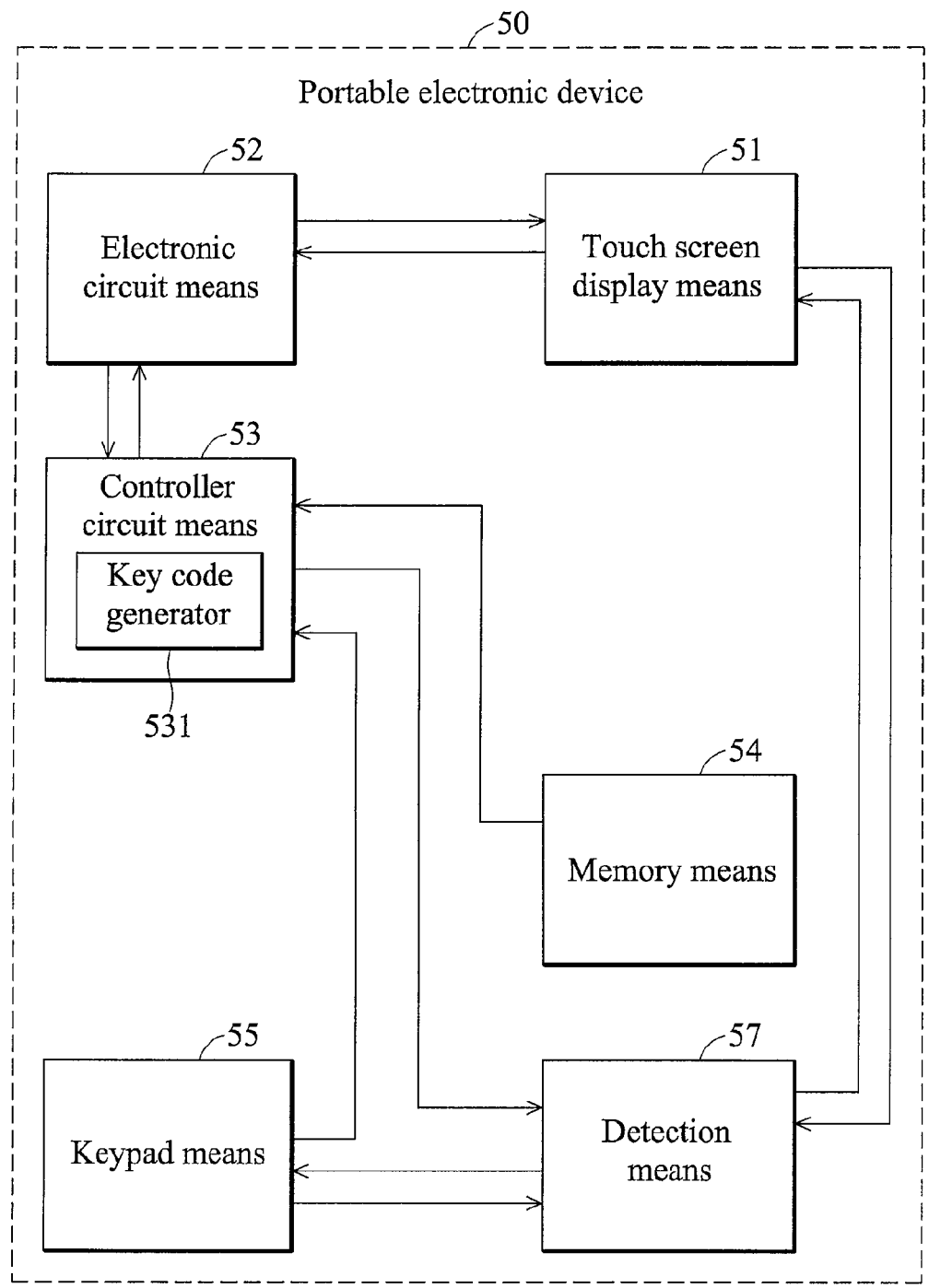
FIG. 5 is a schematic functional block diagram showing functional components of an embodiment of a portable electronic device with a touch screen.

FIG. 5 is a schematic functional block diagram showing functional components of an embodiment of a portable electronic device with a touch screen. The portable electronic device 50 comprises a touch screen display means 51, electronic circuit means 52, controller circuit means 53, memory means 54, keypad means 55, and detection means 57.

The touch screen display means 51 can utilize film-on-glass or other touch screen display technologies known to those skilled in the art. The touch screen display means 51 provides a scene image when an application, such as a game application, is implemented without displaying icons corresponding to directional keys.

Manipulation on a touch screen (not shown in FIG. 5) of portable electronic device 50 is detected by detection means 57. The detection means 57 generates event information in response to a manipulation on the touch screen, wherein the event information specifies position information corresponding to the manipulation.

Electronic circuit means 52 carries out functions of the portable electronic device 50. Controller circuit means 53 can be part of the electronic circuit means 52 but for purposes of explanation is shown as a separate functional element in FIG. 5, cooperating with an instruction set contained within a memory means 54 and a keypad means 55 for input and function selection. The keypad means 55 may only comprise functional keys, but not directional keys. Controller circuit means 53 comprises a key code generator 531 generating a key code corresponding to the event information according to the position and the event type information thereof, wherein the key code indicates an upward, downward, leftward, or rightward key, and the key code does not correspond to any visual item displayed on the touch screen. The controller circuit means 53 controls the portable electronic device 50 according to the key code generated by the key code generator 531. The control function for the touch screen implemented by the controller means 53 can be realized according to the method described in FIGS. 2, 3 and 4.

The memory means 54 stores equations specifying lines partitioning the screen or part of the screen into 4 parts corresponding to the upward, downward, leftward, and rightward key codes, respectively, and the key code generator generates the key code according to the event type information and the position information and the equations. The operation and interconnection of the major functional elements of the portable electronic device 50 are well known to those skilled in the art and may be of any appropriate design to carry out the intended functions.

Methods and systems of the invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electronic wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of controlling a portable electronic device by a touch screen, comprising:

receiving event information in response to a manipulation on the touch screen, wherein the event information specifies a position on the touch screen and the touch screen comprises a region being composed of a plurality of triangles;

generating a key code in response to information indicating which triangle the position falls into, wherein the key code indicates an upward, downward, leftward, or rightward key code; and controlling the portable electronic device according to the key code.

2. The method of claim 1, wherein the event information further comprises event type information specifying whether the event information is generated in response to a press or a release manipulation of the touch screen.

3. The method of claim 2, further generating the key code specifying a pressed key state when the event type information is generated in response to the press manipulation, and generating the key code specifying a released key state when the event type information is generated in response to the release manipulation.

4. The method of claim 1, wherein the generation of the key code further comprises:
providing equations specifying lines partitioning the region into the triangles; and
obtaining information indicating which triangle the position falls into by feeding the position into the equations.

5. The method of claim 4, wherein the equations specify diagonal lines of the touch screen.

6. A portable communication device, comprising:
a touch screen generating event information in response to a manipulation on the screen, wherein the event information specifies a position on the touch screen and the touch screen comprises a region being composed of a plurality of triangles;
a key code generator generating a key code in response to information indicating which triangle the position falls into, wherein the key code indicates an upward, downward, leftward, or rightward key code; and
a controller controlling the portable electronic device according to the key code.

7. The portable communication device of claim 6, wherein the event information further comprises event type information specifying whether the event information is generated in response to a press or a release manipulation of the touch screen.

8. The portable communication device of claim 7, wherein the key code further specifies a pressed key state when the event type information is generated in response to the press manipulation, and further specifies a released key state when the event type information is generated in response to the release manipulation.

9. The portable communication device of claim 6, further comprising a storage device storing equations specifying lines partitioning the region into triangles corresponding to the upward, downward, leftward, and rightward key codes, respectively,
wherein the key code generator obtains information indicating which triangle the position falls into by feeding the position into the equations and generates the key code according to the obtained information.

10. The portable communication device of claim 9, wherein the equations specifying diagonal lines of the touch screen.

11. The method of claim 1, wherein the key code does not correspond to any visual item displayed on the touch screen.

12. The method of claim 4, wherein the equations are provided as follows:

$$Hx-Wy=P; \text{ and}$$

$$Hx+Wy-WH=Q,$$

H represents a height of the region, W represents a width of the region, x and y represent the position, P and Q represents calculated outcomes.

13. The method of claim 12, wherein which triangle that the position falls into is determined by referring to signs of P and Q.

14. The portable communication device of claim 6, wherein the key code does not correspond to any visual item displayed on the touch screen.

15. The portable communication device of claim 9, wherein the equations are provided as follows:

$$Hx-Wy=P; \text{ and}$$

$$Hx+Wy-WH=Q,$$

H represents a height of the region, W represents a width of the region, x and y represent the position, P and Q represents calculated outcomes.

16. The portable communication device of claim 15, wherein which triangle that the position falls into is determined by referring to signs of P and Q.

* * * * *